(12) United States Patent
Husges

(10) Patent No.: US 6,367,440 B1
(45) Date of Patent: Apr. 9, 2002

(54) AIR-INTAKE TUBE SYSTEM FOR INTERNAL COMBUSTION ENGINES

(75) Inventor: Hans-Jurgen Husges, Willich (DE)

(73) Assignee: Pierburg AG, Neuss (DE)

( * ) Notice: Subject to any disclaimer, the term of this patent is extended or adjusted under 35 U.S.C. 154(b) by 0 days.

(21) Appl. No.: 09/618,553

(22) Filed: Jul. 14, 2000

(30) Foreign Application Priority Data

Jul. 16, 1999 (DE) .......................................... 199 33 436

(51) Int. Cl.⁷ .............................................. F02M 35/10
(52) U.S. Cl. ................................................. 123/184.53
(58) Field of Search .................. 123/DIG. 6, 184.53, 123/184.55, 184.31, 184.34

(56) References Cited

U.S. PATENT DOCUMENTS 5,630,386 A  *  5/1997 Uchida .................. 123/184.34

* cited by examiner

Primary Examiner—Tony M. Argenbright
Assistant Examiner—Katrina B. Harris
(74) Attorney, Agent, or Firm—Ladas & Parry

(57) ABSTRACT

An air-intake tube system for internal combustion engines with straight or V-type cylinder configuration having individual intake ducts providing adjustable length of air flow between and air-inlet chamber and the individual cylinders. A maximum duct length is obtained when a shortcut aperture in the intake duct is closed, whereas by opening the shortcut aperture the shortest length of air flow takes place between the inlet chamber and the cylinder. The inlet chamber is closed off by a unit having upper and lower flanges which can be selectively mounted on and demounted from a skirt-like wall of the air-intake ducts. The unit is provided with a self-contained closure-valve mechanism for the shortcut ducts. The lower flange of the unit forms a clearance space therebelow between the intake ducts, in which are disposed further structural elements, containing components which are connected to the cylinder heads of the internal combustion engine and are accessible for maintenance by removing the unit.

8 Claims, 2 Drawing Sheets

AIR-INTAKE TUBE SYSTEM FOR INTERNAL COMBUSTION ENGINES

FIELD OF THE INVENTION

The invention relates to an air-intake tube system for internal combustion engines.

BACKGROUND

Such air-intake tube systems are used for increased power and torque performance in motor-vehicle internal combustion engines and represent an important component thereof.

For internal combustion engines with straight or V-type cylinder configuration, these air-intake tube systems cover almost the entire available space above the cylinders of the internal combustion engine, and thus accessibility to the other engine components, such as injection valves, the fuel-distribution system, exhaust-gas recirculation valves, temperature and pressure sensors, and the like are no longer accessible for necessary maintenance without removal of the entire air-intake tube system.

SUMMARY OF THE INVENTION

Starting from this situation, an object of the invention is to provide an air-intake tube system which permits ready accessibility for maintenance of components of internal combustion engines which are covered by the air-intake tube system.

The above and further objects are achieved by incorporating a separate, removable unit in the air-intake tube system which will provide access to the engine components below the system when the unit is removed.

In accordance with the invention, the air-intake tube system comprises a body having a pair of intake ducts for each cylinder and a unit separately and detachably engageable with the body for cooperating with the ducts to control the length of an air flow path to the cylinder. When the unit is engaged with the body it forms a closed chamber or manifold therewith into which intake air can be supplied. The intake ducts each have one end with a flange for connection to the cylinder and an opposite end adapted for connection to the closed chamber to form a first path for flow of air from said closed chamber to the cylinder. Each duct has an intermediate shortcut aperture directly connecting the interior of the inlet duct and the chamber to form a second, shorter air flow path to the cylinder. The unit has valve means for selectively opening and closing the shortcut apertures, and when closed the first longer path of air flow to the cylinder is established and when open the second, shorter path of air flow is established. The unit comprises upper and lower flanges which are seated on the body to enclose the chamber or manifold when the unit is engaged with the body. The lower flange forms an open clearance space therebelow with the inlet ducts in ducts for accommodating components associated with the engine, the components being accessible when the unit is disengaged and separated from the body.

DETAILED DESCRIPTION

Figure 1:
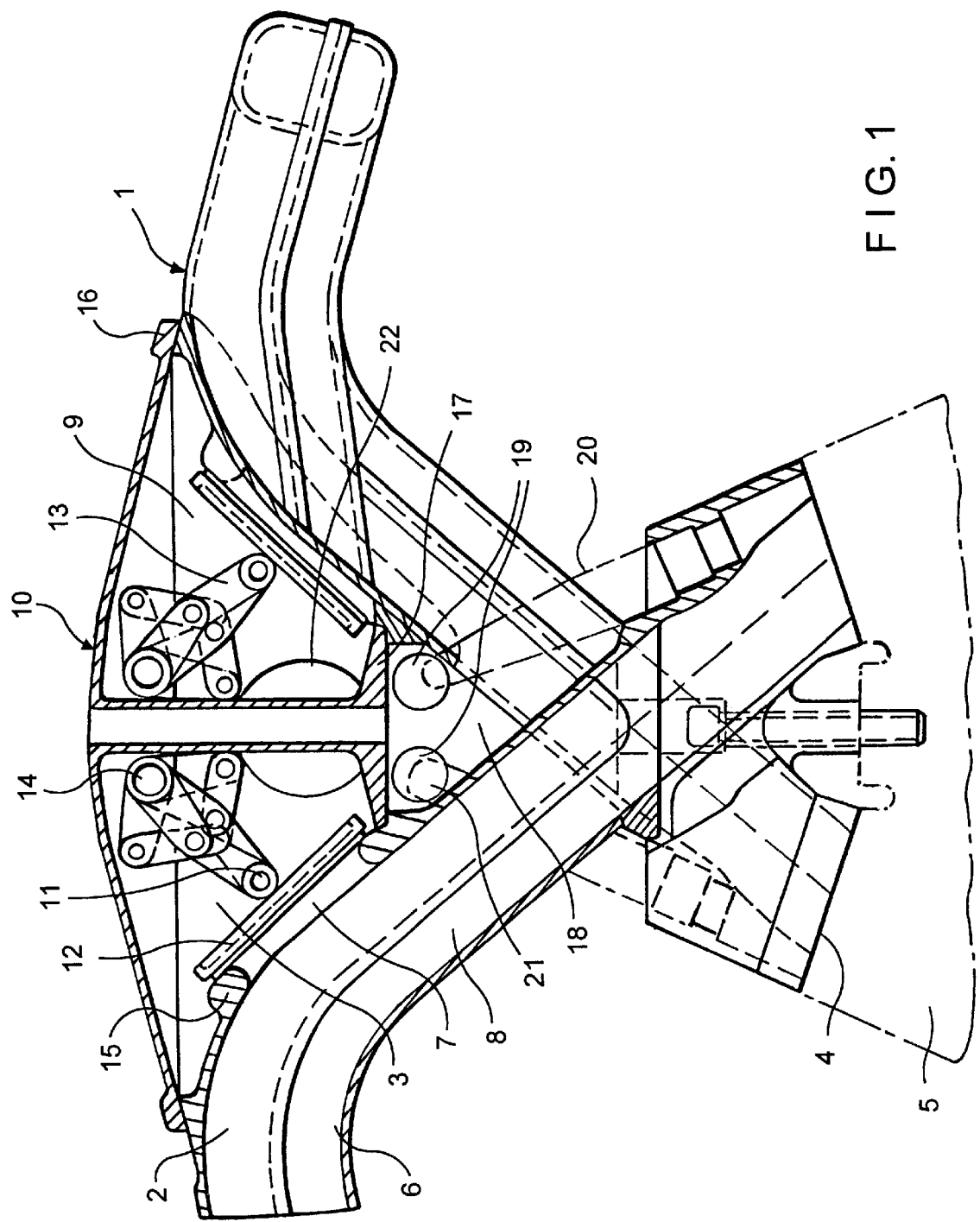
FIG. 1 is a transverse cross-sectional view through an air-intake tube system for an internal combustion engine according to the invention.
Figure 2:
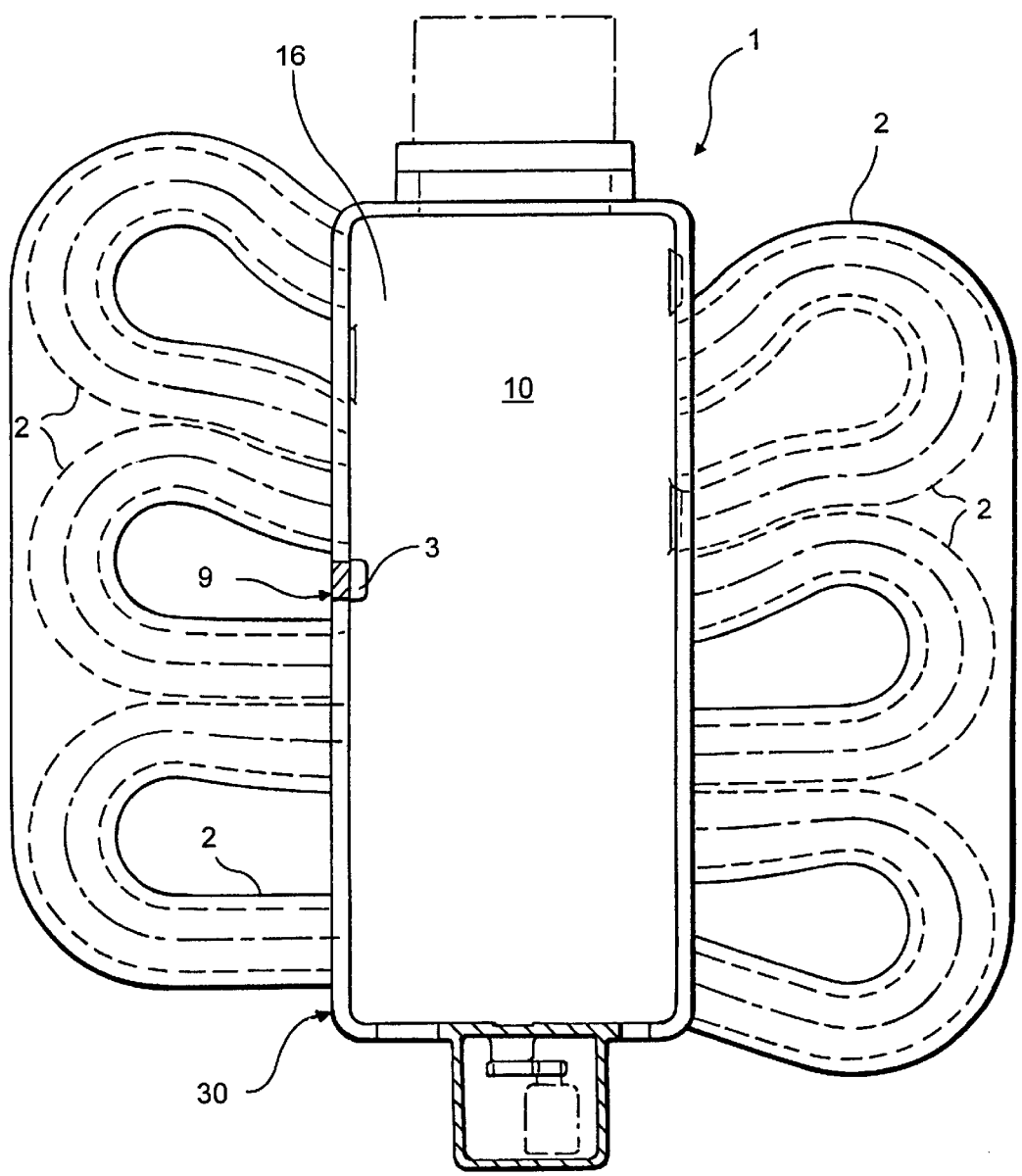
FIG. 2 is a diagrammatic plan view, partly broken away and in section, of the system in FIG. 1.

FIG. 1 illustrates a cross-section of an air-intake tube system 1 for an internal combustion engine with a straight or V-type cylinder configuration. The system 1 includes a hollow body 30 having individual intake ducts 2 which can provide adjustable lengths of air flow from an inlet chamber or manifold 3 and the individual cylinders. The cylinders are not illustrated in detail. The intake ducts 2 are arranged in pairs for respective cylinders and cross one another, each intake duct 2 having a lower flange 4 adapted for connection to a cylinder head 5 (illustrated in broken lines). The opposite or outer ends 6 of the individual intake ducts extend outwardly of the body 30 and are connected to the intake chamber 3 which is supplied with intake air in a manner to be described later.

The individual intake ducts 2 have shortcut apertures 7 located between ends 6 and flanges 4. The shortcut apertures 7 provide a short path 8 for air flow from the inlet chamber 3 to the cylinders whereas the air flow path from the inlet chamber 3 through the ends 6 of the ducts 2 provide a longer air flow path. The shortcut apertures 7 can be opened or closed to selectively adjust the length of the air flow path as will be explained later.

The body 30 includes a skirt 9 integrally formed with the tubes 2 to form a perimetral wall therewith around the chamber 3.

A unit 10 is separately and detachably engageable in the body 30 of the intake tube system 1 to close chamber 3 therein. The unit 10 contains a valve mechanism 11 by which the shortcut apertures can be selectively opened and closed whereby to control the length of the air flow path from the chamber 3 to the cylinders of the engine. The valve mechanism 11 comprises valve members 12 which are connected by a scissors-type lever linkage 13 to control shafts 14 which extend outside the inlet chamber and are externally actuated by control means (not shown). The control means of the shafts 14 can be actuated pneumatically or electrically. The valve members 12 are selectively displaced by the scissors-type linkage to engage valve seats 15 surrounding the shortcut apertures 7 when the shortcut apertures are closed.

The unit 10 comprises an upper flange 16 and a lower flange 17 integrally connected by a web. The unit 10 is installed in the body 30 of the system 1 by insertion of the unit 10 within the space enclosed by the perimetral wall. The upper flange is sealed against an upper portion of the perimetral wall while the lower flange 17 seals against a lower portion of the perimetral wall.

The lower flange 17 forms a clearance space 18 therebelow in which tubular, structural elements 19 are supported and connected to the cylinder head 5. The tubular, structural elements 19 can contain connections 20 for injection valves, while element 21 can be a fuel distributor rail 21 as well as connections for an exhaust gas recirculation valve, temperature and pressure sensors and the like as normally associated with the engine.

In order to gain access to the elements 19 and the components therein, the unit 10 is lifted from the enclosed space in the body 30 to expose the elements 19 so that routine maintenance and repairs can be made on the components therein.

The skirt 9 is provided with an opening 22 at one end of the body for connection with an air inlet line (not shown) coming from the air filter of the air supply means of the engine. The air line can include an injection nozzle by configuring the opening 22 as a throttle valve. An air flow sensor (not shown) is disposed in the air line between the chamber 3 and the air filter.

By virtue of the construction according to the invention, accessibility of elements 19 can be simply achieved by removing the unit 10 so that access to the components therein can be achieved.

Although the invention is disclosed with reference to particular embodiments thereof, it will become apparent to those skilled in the art that numerous modifications and variations can be made which will fall within the scope and spirit of the invention as defined by the attached claims.

What is claimed is:

1. An air inlet system for cylinders of an internal combustion engine in straight or V configuration, said air inlet system comprising:

a hollow body including pair of intake ducts for each cylinder, a unit separately and detachably engageable in said body to form a closed chamber therewith in which intake air can be supplied, said intake ducts each having one end with a flange for connection to a respective cylinder, an opposite end connected to said closed chamber to form a first path for flow of air from said closed chamber to said cylinder, and a shortcut aperture communicating with said chamber, said shortcut aperture being located between said ends of said inlet duct to form a second, shorter path of flow of air from said closed chamber to said cylinder, said unit including valve means for selectively opening and closing said shortcut apertures, said shortcut apertures when closed, providing said first path of air flow to said cylinder and when open providing said second shorter path of air flow from said closed chamber to said cylinder, said unit comprising upper and lower flanges which enclose said chamber when said unit is engaged in said body, said lower flange forming a clearance space therebelow when said unit is engaged in said body so that said clearance space can accommodate components associated with the engine, said components being accessible when said unit is disengaged and separated from said body.

2. The air-inlet system as claimed in claim 1, wherein said valve means comprises linkages and valve members operatively connected to said linkages to selectively open and close said shortcut apertures.

3. The air-inlet system as claimed in claim 2, wherein said linkages include actuators to open and close said shortcut apertures, said actuators extending outside said unit for connection with external control means.

4. The air-inlet system as claimed in claim 1, wherein said pair of ducts extend in crossing relation to one another.

5. The air-inlet system as claimed in claim 1, wherein said components associated with said engine comprise a fuel injection system.

6. The air-inlet system as claimed in claim 1, wherein said body includes a skirt connected with said intake ducts to form a perimetral wall, said skirt having an opening for supply of inlet air into said chamber.

7. The air-inlet system as claimed in claim 6, wherein said opening is configured to form a throttle valve.

8. The air-inlet system as claimed in claim 1, wherein said unit includes a web connecting said upper and lower flanges.

* * * * *